Nov. 23, 1954 C. C. MATERA 2,695,204
ANTIFRICTION BEARING AND CRANKSHAFT AND BEARING ASSEMBLY
Filed April 26, 1951
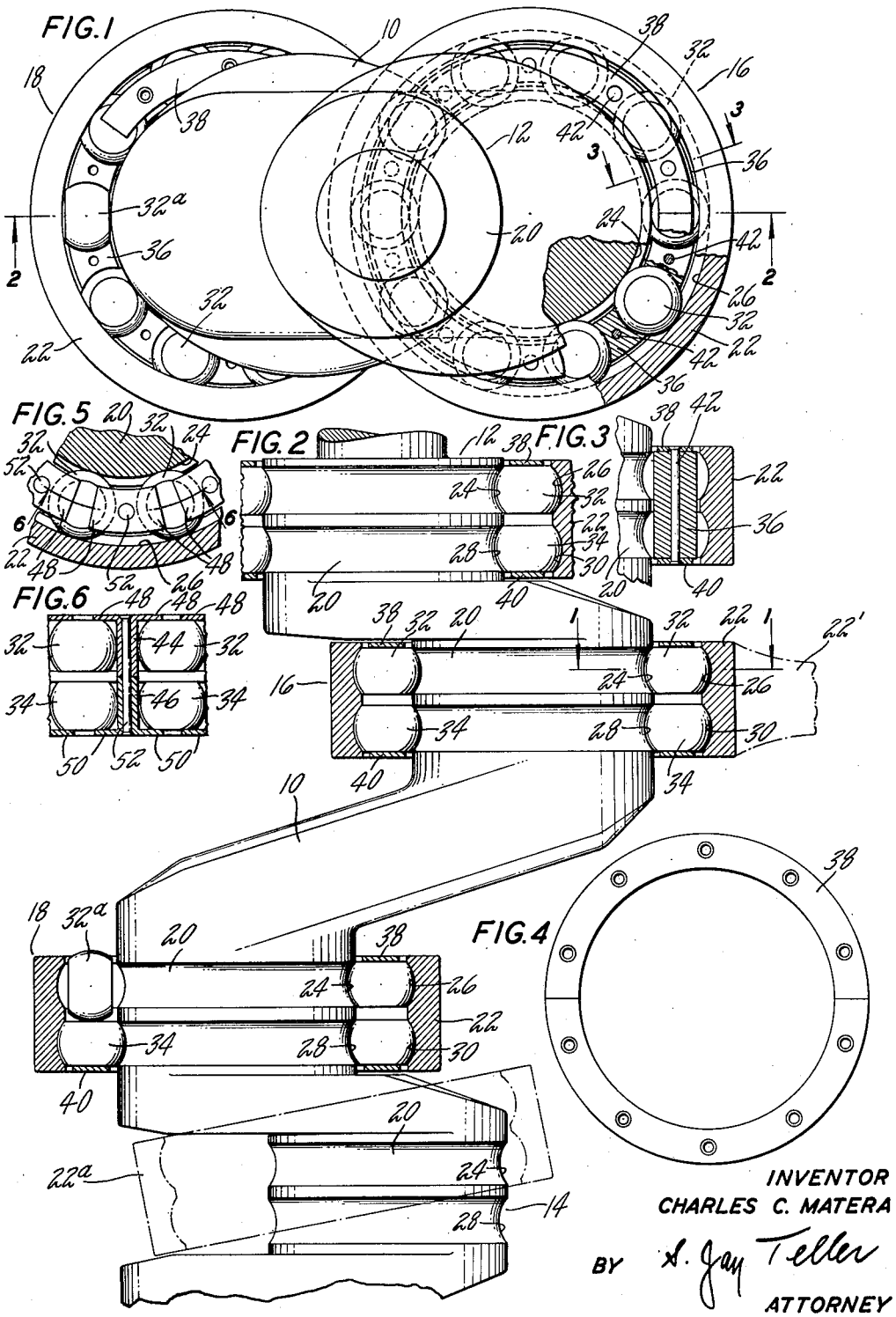
INVENTOR
CHARLES C. MATERA
BY A. Jay Teller
ATTORNEY

United States Patent Office

2,695,204
Patented Nov. 23, 1954

2,695,204

ANTIFRICTION BEARING AND CRANKSHAFT AND BEARING ASSEMBLY

Charles C. Matera, West Hartford, Conn.

Application April 26, 1951, Serial No. 223,055

14 Claims. (Cl. 308—179)

The invention relates to an antifriction bearing and to a crankshaft and bearing assembly.

One object of the invention is to provide an antifriction bearing comprising inner and outer annularly grooved integral one-piece races which are of uniform cross sectional shapes in planes intersecting the bearing axis and comprising ball-like rollers with spherical faces fitting the annular grooves in the races which ball-like rollers are so shaped that they can be assembled with the races notwithstanding the said uniform cross sectional shapes thereof.

A further object of the invention is to provide a crankshaft and bearing assembly wherein the several bearings have the described characteristics and wherein the outer races of the bearings are so related to the crankshaft as to permit them to be moved into the proper positions to form parts of the crankshaft bearings, such as the main and crank bearings of the said shaft.

Other objects of the invention will be apparent from the drawing and from the following description and claims.

In the drawing I have shown in detail two embodiments of the invention, but it will be understood that various changes may be made from the constructions shown, and that the drawing is not to be construed as defining or limiting the scope of the invention, the claims forming a part of this specification being relied upon for that purpose.

Of the drawing:

Fig. 1 is an end view of a crankshaft assembly embodying the invention with the major portion of one of the bearings omitted, the view being partly in section along the line 1—1 of Fig. 2.

Fig. 2 is a longitudinal view partly in section along the line 2—2 of Fig. 1.

Fig. 3 is a fragmentary sectional view taken along the line 3—3 of Fig. 1.

Fig. 4 is a face view of one of the retaining rings.

Fig. 5 is a fragmentary sectional view somewhat similar to the sectional portion of Fig. 1, but showing an alternative construction.

Fig. 6 is a fragmentary view taken along the line 6—6 of Fig. 5.

Referring to the drawing, 10 represents the crankshaft of an engine such as an internal combustion engine, only a portion of the crankshaft being shown. The crankshaft has longitudinally spaced main bearing portions and has connecting rod bearing portions interposed between the main bearing portions and eccentric with respect thereto. Bearings are provided at the said bearing portions, at least one of which bearings is formed in accordance with the invention. Preferably, all of the bearings are formed in accordance with the invention. Two of the bearings at the first said portions are shown at least in part at 12 and 14 and two of the bearings at the second said portions are shown at least in part at 16 and 18. Except as to the bearings, the crankshaft may be of any usual or preferred construction and a detailed description is unnecessary.

One or more of the several bearings, such as those at 12, 16, 18 and 14, are constructed in accordance with the invention, and as shown they are all so constructed. The said bearings at 12, 16, 18 and 14 are similar in construction, but they may vary somewhat in diameter and width. However, all of the bearings are shown as being of the same size. The bearings are of the roller or ball type, having inner and outer races with interposed rollers which are truncated balls as hereinafter explained in detail. The bearing at 12 is shown in Fig. 2, but the major portion thereof is omitted from Fig. 1 for greater clarity of illustration. Only the inner race of the bearing at 14 is shown in Fig. 2. The bearing at 16 is fully shown, but the bearing at 18 is shown as only partly assembled. It will be understood that the outer races of all of the main bearings such as 12 and 14 are suitably supported by the crankcase of the engine. It will also be understood that the outer races of all of the eccentric crank bearings such as 16 and 18 are connected in a suitable manner with the connecting rods of the engine and may be formed integrally therewith. For simplicity of illustration the crankcase is omitted from the drawing.

It will be understood that although the several bearings are shown as parts of a crankshaft and bearing assembly, the invention in its broader aspects is not so limited. One bearing will be described in detail and the description may be regarded as relating more particularly to the eccentric crank bearing at 16, but it is equally applicable to the other bearings. When the bearing is a part of a crankshaft and bearing assembly, the inner race 20 of the bearing is formed integrally with the crankshaft 10. The bearing has an integral one-piece outer race 22 which is spaced outwardly from the inner race 20. When the bearing is a part of a crankshaft and bearing assembly, the outer race may be separate from the connecting rod or it may be formed integrally therewith as indicated by dot-and-dash lines at 22'. The races 20 and 22 are relatively rotatable about a central axis which for the bearing 16 is the eccentric crank axis, and the said races are of uniform cross section in planes intersecting the bearing axis. The inner and outer races 20 and 22 have at least one pair of companion outer and inner registering annular grooves, and preferably there are two pairs of companion grooves with the grooves of the two pairs longitudinally spaced. The grooves of one pair are shown at 24 and 26 and the grooves of the other pair are shown at 28 and 30, the grooves of the two pairs preferably being of the same size and being symmetrically disposed with respect to the transverse central plane of the bearing. The two grooves of each pair are shaped to conform to circular arcs having their centers in the same plane perpendicular to the bearing axis. As shown, the centers of the arcs coincide. Two annular series of rollers in the form of truncated balls 32, 32 and 34, 34 are provided respectively for the pairs of companion grooves in the races. The truncated balls of each series are positioned to enter and fit the annular grooves of the corresponding pair.

The truncated balls of each series are all of the same size and shape and each of them has a spherical face having a radius at least as small as the radius of either of the arcs of the corresponding grooves. When the centers of the radii for the arcs of the two grooves are coincident as shown, the ball surface is preferably exactly spherical and has a radius which is the same as the radii of the arcs of the two grooves. Each of the truncated balls has a reduced width in the direction parallel to the main axis of the bearing and for a reason to be set forth the said reduced width is less than the minimum radial spacing between the inner and outer races 20 and 22 at least at one side thereof. As shown, the reduced width is attained by providing each truncated ball with at least one flat face perpendicular to the bearing axis, and preferably each ball is provided with two opposite parallel flat faces. When there are two flat faces the spacing between them is the same or approximately the same as the widths of the corresponding grooves in the races.

Spacers 36, 36 are located respectively between each two adjacent truncated balls 32, 32 and 34, 34. Each spacer is preferably a unitary one-piece block. Preferably, the balls of the two series are arranged in aligned pairs, and when they are so arranged the same spacers 36, 36 may extend between the truncated balls of the two series. Preferably, and as shown in Fig. 1, each spacer has two oppositely disposed recesses with surfaces conforming to longitudinal cylinders having the same radius as the truncated balls. The said cylindrical faces engage the truncated balls, with the result that the spacers hold the balls in spaced relationship and with the further result that the balls prevent radial movement of the spacers.

A suitable means is provided which is engageable with the truncated balls of each series and which serves to maintain them in positions for individual rotation about axes extending in the directions of their reduced width. When the truncated balls are provided with flat faces perpendicular to the bearing axis, the said means is preferably directly engageable with the said flat faces.

Preferably the spacers 36, 36 are held in place by annular retaining rings 38 and 40 one of which is shown in detail in Fig. 4. The rings are disposed at opposite ends of the spacers and they are rigidly connected with the spacers by rivets 42, 42. The length of the spacers is slightly greater than the spacing between the outer faces of each two aligned truncated balls 32 and 34 and the inner faces of the retaining rings therefore engage or substantially engage the said outer or exposed flat faces of the said balls. The retaining rings are held by the spacers and they serve to retain and guide the truncated balls so that the flat faces thereof remain in perpendicular relationship.

It will be observed that the truncated balls by reason of their spherical faces fit the faces of the companion grooves in the inner and outer races. When the spherical faces of the balls and the arcs of the grooves have the same radii, the said spherical faces of the balls fit the grooves along circular arcs. When the balls so fit, they have the operative characteristics of complete balls, and each bearing is therefore adapted to carry a thrust load as well as a radial load.

The manner of assembly of each bearing will be explained in connection with the partially assembled bearing 18, it being understood that the manner of assembly is approximately the same for all bearings. In describing the manner of assembly it will be assumed that the bearing is a part of a crankshaft and bearing assembly. The first of the assembly steps to be described is obviously not applicable when the bearing is not a part of such an assembly. The integral one-piece outer race 22 of the bearing to be assembled, whether formed separately from the connecting rod or integrally therewith, is moved in its entirety longitudinally along the crankshaft from one end thereof, the race and the connecting rod if formed integrally therewith being turned to different positions as necessary to clear successive portions of the shaft. The internal diameter of each race 22 is such that it will pass over the crankshaft at every portion thereof between one end of the said shaft and the bearing to be assembled. In order that the size of each bearing may be kept at a minimum, the internal diameter of each outer race is such that it passes over the least favorable position on the shaft with a very small clearance. The race 22 for the bearing 18 is shown at an intermediate position at 22ª.

In the following detailed description it will be assumed that there are two pairs of companion grooves and two series of truncated balls. However, the invention is not necessarily so limited. When the race 22 for the bearing 18 has been moved to the position shown by full lines, the several truncated balls 32, 32 and 34, 34 are inserted, the balls 32, 32 being inserted from one side and the balls 34, 34 being inserted from the other side. During insertion, each truncated ball is initially disposed, as shown at 32ª, at an angle of approximately 90° from its eventual operating position. As has been stated, the width of each truncated ball is less than the radial spacing between the inner and outer races at least at one side thereof. This reduced width of the truncated balls permits them to be inserted, as shown. When each truncated ball is fully inserted, it is turned approximately 90° to its operative position. The centers of the grooves of one pair and the centers of the truncated balls of the corresponding series are spaced from the immediately adjacent portions of the truncated balls of the other series by a distance at least as great as the radius of the truncated balls of the first series. This spacing permits the balls of one series to be inserted and turned as described.

In order that the total bearing width may be kept at a minimum, the centers of the grooves of one pair and of the truncated balls of the corresponding series are spaced from the centers of the grooves of the other pair and the centers of the truncated balls of the corresponding other series by a distance less than the sum of the radius of the truncated balls of one series and the radius of the truncated balls of the other series. With this spacing the two balls of one aligned pair cannot be inserted simultaneously, and it will be obvious that one of them must be turned to its operative position before the other can be inserted. The truncated balls must be inserted at the exposed zone at the left as shown in Fig. 1, and they are then moved along the grooves in the races until the required number of truncated balls have been inserted. The spacers 36, 36 are inserted between each pair of adjacent truncated balls 32, 32 and 34, 34, and finally the retaining rings 38 and 40 are put in place and connected with the spacers by the rivets 42, 42. It will be clear that the rings, together with the spacers and truncated balls, must be turned during riveting so that the riveting will take place in the exposed zone at the left.

As shown in Fig. 4, each retaining ring may be formed in two sections. When the rings are so formed, the joints between the two sections of one ring are offset with respect to the joint between the two sections of the other ring. Alternatively, each of the retaining rings 38 and 40 may be formed as one piece with a single radial split. When the rings are so formed and when they comprise highly resilient material, they may be distorted and threaded into the space between the spacers and the cheeks of the crank arms. The rings are positioned with the split in one of them offset from the split in the other of them.

The exact sequence of steps in assembling the truncated balls and the spacers and the retaining rings may be widely varied. For instance, all of the balls of one series may be inserted first and then all of the balls of the other series may be inserted, the spacers being inserted subsequently. Alternatively, the balls of the respective aligned pair may be inserted successively, it being obviously necessary to insert one ball of each pair before the other is inserted. After the two balls of each pair have been inserted, the next adjacent spacer may be inserted. As shown in Figs. 1 and 2, it may be assumed that all of the balls and all of the spacers have been inserted except the ball 32ª which is in process of being inserted.

Figs. 5 and 6 show an alternative construction for spacing and retaining the truncated balls. Each spacer comprises two similar oppositely disposed companion parts 44 and 46. The main portion of each spacer part has the same cross sectional shape as that of the spacers 36 shown in Fig. 1. The spacer part 44 has lips 48, 48 which extend circularly to engage the outer faces of the truncated balls 32, 32. Similarly, the spacer part 46 has lips 50, 50 which extend circularly to engage the outer faces of the truncated balls 34, 34. The two parts 44 and 46 of each spacer are inserted from opposite sides of the bearing and they are connected by a rivet 52. With the construction shown in Figs. 5 and 6 there are no complete annular retaining rings, such as the rings 38 and 40, but the lips 48, 48 and 50, 50 serve as the means for retaining and guiding the truncated balls so that the flat faces thereof remain in their perpendicular relationship.

The invention claimed is:

1. An antifriction bearing comprising in combination, inner and outer annular races relatively rotatable about a central axis and having therein companion inner and outer registering annular grooves, the said races being of uniform cross section in planes intersecting the bearing axis and the said grooves conforming to circular arcs having the same center, an annular series of truncated bearing balls entered in and fitting the companion grooves in the races, each of the said truncated balls being provided with a spherical face having the same radius as the said arcs of the grooves in the races and being provided with at least one flat face perpendicular to the bearing axis and each of the said truncated balls having a width less than the minimum radial spacing between the inner and outer races at one side thereof, an annular series of unitary one-piece spacers each having two oppositely disposed recesses with surfaces conforming to longitudinal cylinders having the same radius as the truncated balls, the said spacers being located respectively between adjacent balls with their faces engaging the said balls whereby the spacers hold the balls in spaced relationship and whereby the balls prevent radial movement of the spacers, and retaining means connected with the several spacers and engageable with the flat faces of the truncated balls for maintaining the said faces in their perpendicular relationship.

2. An antifriction bearing comprising in combination, inner and outer annular races relatively rotatable about a central axis and having therein companion inner and outer registering annular grooves, the said races being of uniform cross section in planes intersecting the bearing axis and the said grooves conforming to circular arcs having their centers in the same plane perpendicular to the axis, an annular series of truncated bearing balls entered in and fitting the companion grooves in the races, each of the said truncated balls being provided with a spherical face having a radius at least as small as the radius of either of the said arcs of the grooves in the races and being provided with at least one flat face perpendicular to the bearing axis and each of the said truncated balls having a width less than the minimum radial spacing between the inner and outer races at one side thereof, an annular series of unitary one-piece spacers each having two oppositely disposed recesses with surfaces conforming to longitudinal cylinders having the same radius as the truncated balls, the said spacers being located respectively between adjacent balls with their faces engaging the said balls whereby the spacers hold the balls in spaced relationship and whereby the balls prevent radial movement of the spacers, and a unitary retaining ring connected with the several spacers and having a flat face perpendicular to the axis and engageable with the flat faces of the several truncated balls for maintaining the said faces in their perpendicular relationship.

3. An antifriction bearing comprising in combination, inner and outer annular races relatively rotatable about a central axis and having therein two pairs of longitudinally spaced companion inner and outer registering annular grooves, the said races being of uniform cross section in planes intersecting the bearing axis and the said grooves of each pair conforming to circular arcs having the same center, an annular series of truncated bearing balls entered in and fitting the companion grooves of one pair, a second annular series of truncated balls entered in and fitting the companion grooves of the other pair with an open space between the truncated balls of the two series, each of the said truncated balls of each series being provided with a spherical face having the same radius as the said arcs of the grooves of the corresponding pair and each of the said truncated balls of each series having a reduced width in the direction parallel to the bearing axis which width is less than the minimum radial spacing between the inner and outer races at the corresponding side thereof, spacers located respectively between adjacent truncated balls of the two said series, and two means carried by the several spacers and respectively engaging the truncated balls of the two series at the outer sides thereof to maintain the said balls in positions for individual rotation about axes extending in the direction of their reduced width.

4. An antifriction bearing comprising in combination, inner and outer annular races relatively rotatable about a central axis and having therein two pairs of longitudinally spaced companion inner and outer registering annular grooves, the said races being of uniform cross section in planes intersecting the bearing axis and the said grooves of each pair conforming to their centers in the same plane perpendicular to the axis, circular arcs having an annular series of truncated bearing balls entered in and fitting the companion grooves of one pair, a second annular series of truncated balls entered in and fitting the companion grooves of the other pair with an open space between the truncated balls of the two series, each of the said truncated balls of each series being provided with a spherical face having a radius at least as small as the radius of either of the said arcs of the grooves of the corresponding pair and each of the said truncated balls of each series having a reduced width in the direction parallel to the bearing axis which width is less than the minimum radial spacing between the inner and outer races at the corresponding side thereof, the centers of the grooves of one pair and the centers of the truncated balls of the corresponding series being spaced from the immediately adjacent portions of the truncated balls of the other series by a distance at least as great as the radius of the truncated balls of the first series, spacers located respectively between adjacent truncated balls of the two said series, and means engageable with the truncated balls of each series to maintain them in positions for individual rotation about axes extending in the directions of their reduced width.

5. An antifriction bearing as set forth in claim 4, wherein the centers of the grooves of one pair and of the truncated balls of the corresponding series are spaced from the centers of the grooves of the other pair and the centers of the truncated balls of the corresponding other series by a distance less than the sum of the radius of the truncated balls of one series and the radius of the truncated balls of the other series.

6. An antifriction bearing comprising in combination, inner and outer annular races relatively rotatable about a central axis and having therein two pairs of longitudinally spaced companion inner and outer registering annular grooves, the said races being of uniform cross section in planes intersecting the bearing axis and the said grooves of each pair conforming to circular arcs having the same center, an annular series of truncated bearing balls entered in and fitting the companion grooves of one pair, a second annular series of truncated balls entered in and fitting the companion grooves of the other pair, each of the said truncated balls of each series being provided with a spherical face having the same radius as the said arcs of the grooves of the corresponding pair and each of the said truncated balls of each series being provided with at least one flat face perpendicular to the bearing axis and at the side remote from the truncated balls of the other series and each of the said truncated balls having a width less than the minimum radial spacing between the inner and outer races at the corresponding side thereof, unitary one-piece spacers for the truncated balls of the two said series each of which spacers has two oppositely disposed recesses with surfaces conforming to longitudinal cylinders having the same radius as the corresponding truncated balls, the said spacers being located respectively between adjacent balls with their faces engaging the said balls whereby the spacers hold the balls in spaced relationship and whereby the balls prevent radial movement of the spacers, and two unitary retaining rings connected with the several spacers at the ends thereof and each engageable with the said flat faces of the several truncated balls of the corresponding series for maintaining the said ball faces in their perpendicular relationship.

7. An antifriction bearing comprising in combination, inner and outer annular races relatively rotatable about a central axis and having therein two pairs of longitudinally spaced companion inner and outer registering annular grooves, the said races being of uniform cross section in planes intersecting the bearing axis and the said grooves of the two pairs having the same size and shape and the grooves of each pair conforming to circular arcs having their centers in the same plane perpendicular to the axis, an annular series of truncated bearing balls entered in and fitting the companion grooves of one pair, a second annular series of truncated balls entered in and fitting the companion grooves of the other pair with the balls of the second series respectively aligned with the balls of the first series to provide pairs of balls, each of the said truncated balls of each series being provided with a spherical face having a radius at least as small as the radius of either of the said arcs of the grooves of the corresponding pair and each of the said truncated balls of each series being provided with at least one flat face perpendicular to the bearing axis and at the side remote from the truncated balls of the other series and each of the said truncated balls having a width less than the minimum radial spacing between the inner and outer races at the corresponding side thereof, a single annular series of spacers located respectively between adjacent pairs of truncated balls, and means rigidly connected with the several spacers and having flat faces engageable respectively with the said flat faces of the truncated balls of the said two series for maintaining the said ball faces in their perpendicular relationship.

8. A crankshaft and bearing assembly comprising in combination, a crankshaft having longitudinally spaced main bearing portions and having connecting rod bearing portions interposed between the main bearing portions and eccentric with respect thereto, at least one of the said bearing portions being formed to constitute an annular inner bearing race, an integral one-piece outer annular bearing race concentric with the said inner race and having an internal diameter of such size as to permit the said race in its entirety to be moved longitudinally along the crankshaft from one end thereof into registering relationship with the said inner race, the said races being of uniform cross section in planes intersecting the bearing axis and having therein inner and outer registering annular grooves which conform to circular arcs having their centers in the same plane perpendicular to the bearing axis, an annular series of truncated bearing balls entered in and fitting the companion grooves in the races, each of the said truncated balls being provided with a spherical face having a radius at least as small as either of the said arcs of the grooves in the races and each of the said truncated balls having a reduced width in the direction parallel to the bearing axis which width is less than the minimum radial spacing between the inner and outer races at one side thereof, an annular series of spacers located respectively between adjacent truncated balls, and means engageable with the truncated balls to maintain them in positions for individual rotation about axes extending in the directions of their reduced width.

9. A crankshaft and bearing assembly comprising in combination, a crankshaft having longitudinally spaced main bearing portions and having connecting rod bearing portions interposed between the main bearing portions and eccentric with respect thereto, all of the said bearing portions being formed respectively to constitute annular inner bearing races, a plurality of integral one-piece outer annular bearing races respectively concentric with the said inner races and each having an internal diameter of such size as to permit the said race in its entirety to be moved longitudinally along the crankshaft from one end thereof into registering relationship with the corresponding inner race, the said inner and outer races of each bearing having therein inner and outer registering annular grooves which conform to circular arcs having the same center, a plurality of annular series of truncated bearing balls, the said balls of each series being entered in and fitting the companion grooves in the corresponding inner and outer races and each of the said truncated balls of each series being provided with a spherical face having the same radius as the said arcs of the grooves in the corresponding races and each of the said truncated balls of each series having a reduced width in the direction parallel to the bearing axis which width is less than the minimum radial spacing between the corresponding inner and outer races at one side thereof, a plurality of annular series of spacers, the spacers of each series being located respectively between adjacent truncated balls of the corresponding series, and a plurality of means engageable respectively with the truncated balls of the corresponding series to maintain the said balls in positions for individual rotation about axes extending in the directions of their reduced width.

10. A crankshaft and bearing assembly comprising in combination, a crankshaft having longitudinally spaced main bearing portions and having connecting rod bearing portions interposed between the main bearing portions and eccentric with respect thereto, at least one of the said bearing portions being formed to constitute an annular inner bearing race, an integral one-piece outer annular bearing race concentric with the said inner race and having an internal diameter of such size as to permit the said race in its entirety to be moved longitudinally along the crankshaft from one end thereof into registering relationship with the said inner race, the said races being of uniform cross section in planes intersecting the bearing axis and having therein inner and outer registering annular grooves which conform to circular arcs have their centers in the same plane perpendicular to the bearing axis, an annular series of truncated bearing balls entered in and fitting the companion grooves in the races, each of the said truncated balls being provided with a spherical face having a radius at least as small as the radius of either of the said arcs of the grooves in the races and being provided with at least one flat face perpendicular to the bearing axis and each of the said truncated balls having a width less than the minimum radial spacing between the inner and outer races at one side thereof, an annular series of spacers located respectively between adjacent truncated balls, and means rigidly connected with the several spacers and having a flat face engageable with the flat faces of the several truncated balls for maintaining the said ball faces in their perpendicular relationship.

11. A crankshaft and bearing assembly comprising in combination, a crankshaft having longitudinally spaced main bearing portions and having connecting rod bearing portions interposed between the main bearing portions and eccentric with respect thereto, at least one of the said bearing portions being formed to constitute an annular inner bearing race, an integral one-piece outer annular bearing race concentric with the said inner race and having an internal diameter of such size as to permit the said race in its entirety to be moved longitudinally along the crankshaft from one end thereof into registering relationship with the said inner race, the said races being of uniform cross section in planes intersecting the bearing axis and having therein two pairs of longitudinally spaced companion inner and outer registering annular grooves with the grooves of each pair conforming to circular arcs having the same center, an annular series of truncated bearing balls entered in and fitting the companion grooves of one pair, a second annular series of truncated balls entered in and fitting the companion grooves of the other pair, each of the said truncated balls of each series being provided with a spherical face having the same radius as the said arcs of the grooves of the corresponding pair and each of the said truncated balls of each series having a reduced width in the direction parallel to the bearing axis which width is less than the minimum radial spacing between the inner and outer races at the corresponding side thereof, spacers located respectively between adjacent truncated balls of the two said series, and means engageable with the truncated balls of each series to maintain them in positions for individual rotation about axes extending in the directions of their reduced width.

12. A crankshaft and bearing assembly comprising in combination, a crankshaft having longitudinally spaced main bearing portions and having connecting rod bearing portions interposed between the main bearing portions and eccentric with respect thereto, at least one of the said bearing portions being formed to constitute an annular inner bearing race, an integral one-piece outer annular bearing race concentric with the said inner race and having an internal diameter of such size as to permit the said race in its entirety to be moved longitudinally along the crankshaft from one end thereof into registering relationship with the said inner race, the said races being of uniform cross section in planes intersecting the bearing axis and having therein two pairs of longitudinally spaced companion inner and outer registering annular grooves with the grooves of each pair conforming to circular arcs having their centers in the same plane perpendicular to the bearing axis, an annular series of truncated bearing balls entered in and fitting the companion grooves of one pair, a second annular series of truncated balls entered in and fitting the companion grooves of the other pair with an open space between the truncated balls of the two series, each of the said truncated balls of each series being provided with a spherical face having a radius at least as small as the radius of either of the said arcs of the grooves of the corresponding pair and each of the said truncated balls of each series being provided with at least one flat face perpendicular to the bearing axis at the side remote from the truncated balls of the other series and each of the said truncated balls having a width less than the minimum radial spacing between the inner and outer races at the corresponding side thereof, the centers of the grooves of one pair and the centers of the truncated balls of the corresponding series being spaced from the immediately adjacent portions of the truncated balls of the other series by a distance at least as great as the radius of the truncated balls of the first series, spacers located respectively between adjacent truncated balls of the two said series, and means engageable with the truncated balls of each series to maintain them in positions for individual rotation about axes extending in the directions of their reduced width.

13. A crankshaft and bearing assembly comprising in combination, a crankshaft having longitudinally spaced main bearing portions and having connecting rod bearing portions interposed between the main bearing portions and eccentric with respect thereto, at least one of the said bearing portions being formed to constitute an annular inner bearing race, an integral one-piece outer annular bearing race concentric with the said inner race and having an internal diameter of such size as to permit the said race in its entirety to be moved longitudinally along the crankshaft from one end thereof into registering relationship with the said inner race, the said races being of uniform cross section in planes intersecting the bearing axis and having therein two pairs of longitudinally spaced companion inner and outer registering annular grooves with the grooves of each pair conforming to circular arcs having their centers in the same plane perpendicular to the bearing axis, an annular series of truncated bearing balls entered in and fitting the companion grooves of one pair, a second annular series of truncated balls entered in and fitting the companion grooves of the other pair, each of the said truncated balls of each series being provided with a spherical face having a radius at least as small as the radius of either of the said arcs of the grooves of the corresponding pair and each of the said truncated balls of each series being provided with at least one flat face perpendicular to the bearing axis at the side remote from the truncated balls of the other series and each of the said truncated balls having a width less than the minimum radial spacing between the inner and outer races at the corresponding side thereof, spacers for the truncated balls of the two said series each of which spacers has two oppositely disposed recesses with surfaces conforming to longitudinal cylinders having the same radius as the corresponding truncated balls, the said spacers being located respectively between adjacent balls with their faces engaging the said balls whereby the spacers hold the balls in spaced relationship and whereby the balls prevent radial movement of the spacers, and means rigidly connected with the several spacers and having flat faces engageable with the said flat faces of the several truncated balls of each series for maintaining the said ball faces in their perpendicular relationship.

14. A crankshaft and bearing assembly comprising in combination, a crankshaft having longitudinally spaced main bearing portions and having connecting rod bearing portions interposed between the main bearing portions and eccentric with respect thereto, at least one of the said bearing portions being formed to constitute an annular inner bearing race, an integral one-piece outer annular bearing race concentric with the said inner race and having an internal diameter of such size as to permit the said race in its entirety to be moved longitudinally along the crankshaft from one end thereof into registering relationship with the said inner race, the said races being of uniform cross section in planes intersecting the bearing axis and having therein two pairs of longitudinally spaced companion inner and outer registering annular grooves with the grooves of each pair conforming to circular arcs having the same center, an annular series of truncated bearing balls entered in and fitting the companion grooves of one pair, a second annular series of truncated balls entered in and fitting the companion grooves of the other pair with the balls of the second series respectively aligned with the balls of the first series to provide pairs of balls, each of the said truncated balls of each series being provided with a spherical face having the same radius as the said arcs of the grooves of the corresponding pair and each of the said truncated balls of each series being provided with at least one flat face perpendicular to the bearing axis and at the side remote from the truncated balls of the other series and each of the said truncated balls having a width less than the minimum radial spacing between the inner and outer races at the corresponding side thereof, a single annular series of spacers for the said pairs of truncated balls, and means rigidly connected with the several spacers and having flat faces engageable respectively with the said flat faces of the truncated balls of the said two series for maintaining the said ball faces in their perpendicular relationship.

References Cited in the file of this patent

UNITED STATES PATENTS

| Number | Name | Date |
| --- | --- | --- |
| 1,790,253 | Taylor | Jan. 27, 1931 |

FOREIGN PATENTS

| Number | Country | Date |
| --- | --- | --- |
| 31,453 | Norway | Dec. 13, 1920 |
| 50,952 | Sweden | Sept, 27, 1919 |
| 53,193 | Sweden | Nov. 24, 1921 |
| 60,697 | Sweden | Feb. 23, 1924 |
| 105,861 | Germany | Dec. 4, 1898 |
| 257,111 | Italy | Dec. 4, 1925 |
| 455,490 | France | Aug. 1, 1913 |
| 517,536 | France | May 7, 1921 |